United States Patent
Ramirez Nunez

(10) Patent No.: US 11,781,649 B2
(45) Date of Patent: Oct. 10, 2023

(54) EXTERNAL MATERIAL INTRUSION-PROOF SEALING SYSTEM FOR ROLLERS USED IN CONVEYOR BELTS FOR BULK MATERIALS

(71) Applicant: Gabriel Ramirez Nunez, Mexico City (MX)

(72) Inventor: Gabriel Ramirez Nunez, Mexico City (MX)

( * ) Notice: Subject to any disclaimer, the term of this patent is extended or adjusted under 35 U.S.C. 154(b) by 24 days.

(21) Appl. No.: 17/347,029

(22) Filed: Jun. 14, 2021

(65) Prior Publication Data

US 2022/0397196 A1    Dec. 15, 2022

(51) Int. Cl.
*F16J 15/00* (2006.01)
*B65G 23/04* (2006.01)

(52) U.S. Cl.
CPC ............. *F16J 15/002* (2013.01); *B65G 23/04* (2013.01)

(58) Field of Classification Search
CPC ......... B65G 23/04; F16J 15/447; F16J 15/002
See application file for complete search history.

(56) References Cited

U.S. PATENT DOCUMENTS

| | | | | |
|---|---|---|---|---|
| 937,916 A | * | 10/1909 | Bentley | F16J 15/4476 277/420 |
| 1,316,964 A | * | 9/1919 | London | F16J 15/4476 277/420 |
| 1,908,804 A | * | 5/1933 | Wiberg | F16J 15/4476 277/420 |
| 2,159,766 A | * | 5/1939 | Larrecq | F16J 15/4476 277/420 |
| 2,262,382 A | * | 11/1941 | Bierend | F16J 15/4476 277/420 |
| 4,348,067 A | * | 9/1982 | Tooley | F16J 15/002 384/480 |
| 4,973,063 A | * | 11/1990 | Korenblit | F16J 15/3456 277/420 |
| 6,843,482 B1 | * | 1/2005 | Bayne | F16J 15/002 277/412 |
| 10,054,226 B1 | * | 8/2018 | Watson | F16J 15/447 |
| 2009/0302543 A1 | * | 12/2009 | Ruggiero | H02K 5/124 277/303 |
| 2015/0260295 A1 | * | 9/2015 | McCoy | F16J 15/4472 277/303 |
| 2016/0305283 A1 | * | 10/2016 | Morreale | F02C 7/28 |
| 2018/0023682 A1 | * | 1/2018 | Reineberg | F16J 15/32 277/572 |
| 2019/0353288 A1 | * | 11/2019 | Hoeting | F16C 33/762 |
| 2022/0010806 A1 | * | 1/2022 | Purdey | F01D 11/00 |

FOREIGN PATENT DOCUMENTS

JP    2011220389 A  *  11/2011

* cited by examiner

*Primary Examiner* — Eugene G Byrd
(74) *Attorney, Agent, or Firm* — Defillo & Associates, Inc; Evelyn A. Defillo

(57) ABSTRACT

A sealing system which is designed to leverage the centrifugal acceleration of solids and liquids due to the natural rotation of the roller, expelling them outside, preventing most of the contamination from trying to penetrate the roller seals. Excess of contaminants that is not centrifugally expelled is blocked by the following internal sealing system.

6 Claims, 4 Drawing Sheets

EXTERNAL MATERIAL INTRUSION-PROOF SEALING SYSTEM FOR ROLLERS USED IN CONVEYOR BELTS FOR BULK MATERIALS

FIELD OF INVENTION

The present invention relates to means for bearings, more specifically, with protection means for transportation rollers and conveyor belts for bulk materials.

BACKGROUND OF THE INVENTION

Wheels have been used as means for producing motion of different types of mechanical devices which are part of means of land, sea and air transportation, industrial machinery, and are practically present in most devices involving motion, application and multiplication of effort, force, transportation of materials, energy, and mechanical control. The problem facing all these forms of application of circular motion by means of transmission shafts or movable bearings coupled to fixed shafts, is how to eliminate frictional forces effects due to contact between fixed and/or moving parts or forces generated by the intrusion of external materials within their mechanical components which obstruct and paralyze them. With current art, these problems are faced by applying lubricating liquids (petroleum and silicone oils and greases, lubricating powders (graphite)), which reduce or prevent friction between contact surface of such components, and the high friction coefficient.

In the case of the use of lubricants, operation efficiency of a mechanism whose moving components generate friction forces will depend on the thickness of the layer of the lubricating substance distributed between the surfaces in dynamic contact; on the properties of the lubricating substance; on the operating conditions (temperature generated by friction, time of use, lubricant losses due to filtrations) of the mechanism, and on the movement of substances in and out of the mechanism (lubricant filtrations, incorporation of solid substances coming from the outside, e.g., dust, wood chips, small stones, etc.). In both cases, lubricant losses, as well as intrusion of solid materials from the outside are prevented by the use of seals and gaskets that are part of such mechanisms.

Seals can be grouped into classes according to their structures, functions, or operational and use types:

Balanced seals and unbalanced seals.
Thrust seals and bellows seals.
Rotary seals and stationary seals
Mechanical seals pressurized from the outside and pressurized from the inside.
Single and multiple seals
Cartridge-type mechanical seals
Gas lubricated mechanical seals.

These types of seals are used in a very wide variety of motion and force transmission mechanisms, but their main function is to ensure the structure integrity of the mechanisms that actuate circular or other shaped paths, as well as the lubricant used to reduce friction between the various mechanism coupled parts.

Most rollers used in conveyor belts or transport rollers have problems, as they jam or deteriorate rapidly if any external material gets into their mechanism, e.g., water, sand, dirt, ground glass, metallic dust, wood sawdust, etc., when their seals do not provide adequate protection and expose them to the risks of the effects of abrasion, corrosion, obstruction, etc.

The spectrum of disadvantages of the prior art, ranges from an extreme in which the very design of the bearing mechanisms, is by default one for which the sealing protection measures of such mechanisms are very simple or null, especially when it comes to rollers for belt conveyor mechanisms for conveying compact or pack-protected solid materials that produce only a few particulate matters that can penetrate these mechanisms and alter their dynamics, to the case of belt conveyor for bulk materials (construction materials such as sand and gravel, soil, coal, metallic minerals, quartz, powders, salts, wood, etc.), whose aggregation level and chemical reactivity represent a risk for the integrity and performance of such rollers, or operate outdoors and are subject to unfavorable weather conditions (rain, water, moisture, intense solar radiation).

Another disadvantage of the prior art is the fact that, in general, the roller sealing protection systems used in bulk material conveyor belts, in many cases, are reduced to the use of bearing carriers covers placed on both sides of said bearing, which generally prevent the intrusion of solid particles of significant dimensions.

Yet, another disadvantage of the prior art in the protection of belt rollers consists in the use of roller protection systems consisting in the use of bearing carrier covers, aided by the inclusion in the design of a simple fence or labyrinth, which although it eliminates the intrusion of large solids in most cases, it cannot eliminate the risk of intrusion of liquids and fine solid particles, so that its use is clearly insufficient.

The inventor of the present invention developed a series of experiments, tests and trials which produced a roller sealing system which is of paramount importance in the engineering part in which the invention is comprised.

The applicant herein has developed a sealing system which is designed to leverage the centrifugal acceleration of solids and liquids due to the natural rotation of the roller, expelling them to the outside, preventing most of the contamination from trying to penetrate the roller seals. Excess of contaminants that is not centrifugally expelled is blocked by the following system of four barriers or seals:

A shock-proof, solid contaminant-sweeping, floating-type primary (outer) seal designed to prevent clogging of coarse contaminants.

A 4-pass vertical labyrinth configuration with millimeter adjustment on the first pass to prevent entry of fine contaminants. This seal prevents the entry of solids, and only allows the entry of liquids and moisture to the chamber.

A chamber with vertical diaphragm for a hermetic sealing of the system, which prevents the entry of liquids and moisture to the system.

A 9-pass vertical triple labyrinth seal to retain contaminants. On the outside, it forms a cavity in conjunction with the ball bearing holder cover to isolate contaminants, and to divert them outside the roller.

Cup or suspension with chamber for internal roller sealing, grease storage and proper bearing positioning.

One of the outstanding features of the sealing system of the present invention is the floating-type primary seal which prevents clogging of the rollers by coarse solid contaminants, and which, at the same time, prevents the ingress of fine contaminants which can damage the internal roller mechanism by abrasion effects.

Another important feature of the roller sealing system of the present invention is the chamber with a vertical diaphragm for a hermetic sealing of the system, which avoids the entrance of liquids and moisture into the system; this results from the devised structure as it leverages the characteristics of the centrifugal movement to first isolate the contaminants that have penetrated the system and in a second time, continuously expel them outside the roller.

A further feature of the roller sealing system of the present invention is the 9-pass vertical triple labyrinth seal, as due to its design, it leverages the centrifugal movement characteristics to isolate the contaminants that have penetrated the system first, and then, in a second time, continuously expel them outside the roller.

In addition, another of the main advantages is the whole design of the sealing system, which guarantees total reliability of the mechanism, by leveraging the centripetal and centrifugal forces operating within the structure of the barriers that make up the sealing system.

INVENTION OBJECTIVES

A main objective of the present invention is to provide a sealing system for bulk material conveyor belts, designed to leverage the centrifugal acceleration of solids and liquids due to the natural rotation of the roller, expelling them to the outside, preventing most of the contamination from trying to penetrate the roller seals. Excess of contaminants that is not centrifugally expelled is blocked by an internal sealing system.

Another objective of the present invention is to provide a hermetic, centrifugal roller sealing system for bulk material conveyor belts.

A further objective of the present invention is to increase the lifetime of the bulk material conveying rollers which constituting the belt drive mechanism.

BRIEF DESCRIPTION OF DRAWINGS

For a better understanding of the present invention, it is described based on a preferred embodiment illustrated in the figures accompanying this description where.

PREFERRED EMBODIMENT OF THE INVENTION

Figure 1:
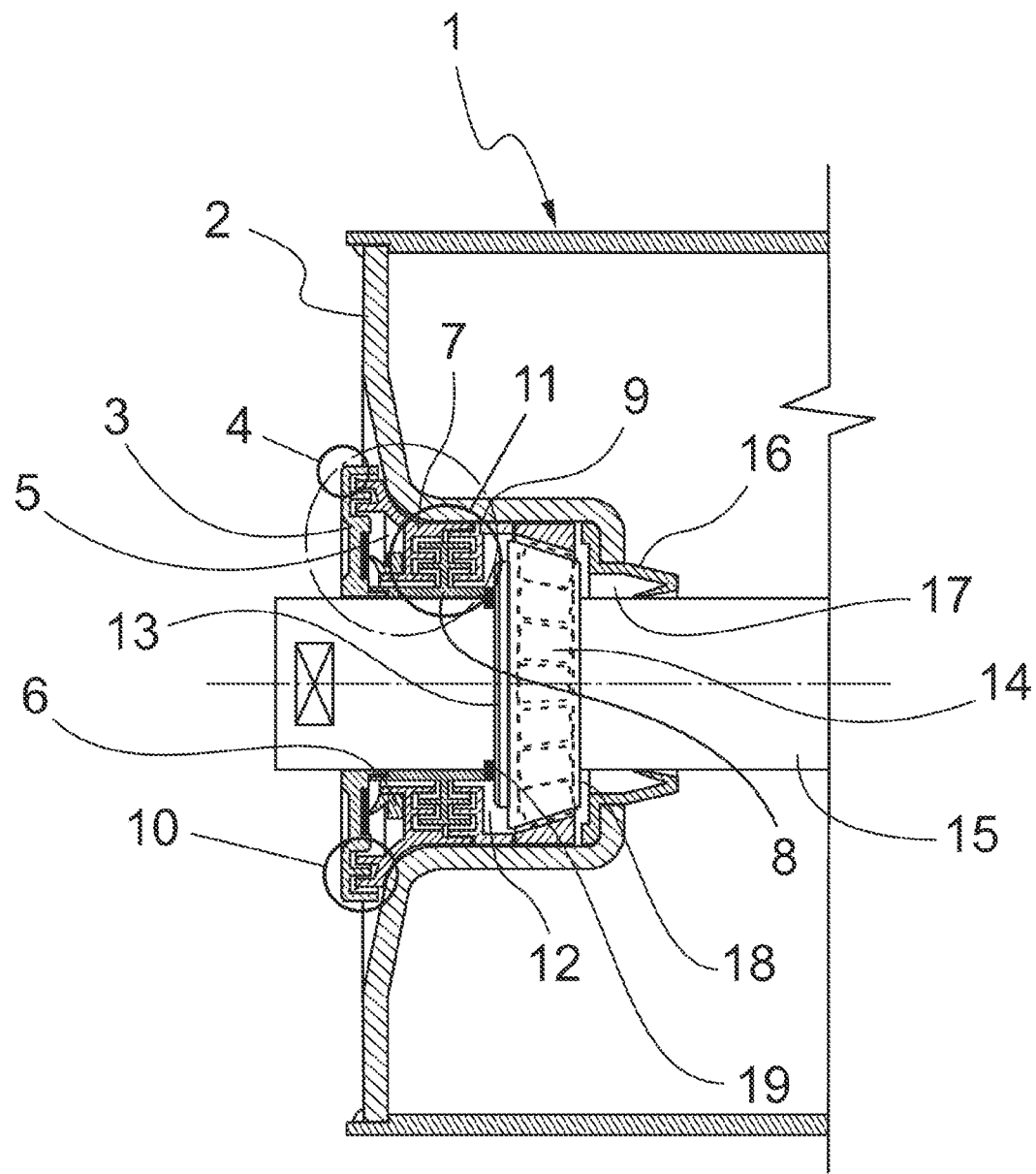
FIG. 1 is a side view of a sectional section of the roller sealing system for bulk material conveyor belts of the present invention, showing the details of the structure of such system.

The present invention is described based on a preferred embodiment in which:

It is to be understood that the invention is not limited in its application to the construction details and component arrangement set forth in the accommodation presentation and illustrated in the drawings.

It is noted, unless otherwise provided, that all technical or scientific terms used herein have the same meaning as commonly held by persons having knowledge of the arts of the invention. The methods and examples provided herein are illustrative and are not intended to be limiting.

Essentially, the hermetic centrifugal system is formed by the successive mechanical and dynamic coupling of a wide variety of vertical covers of various compositions or seals in the form of rings and circular barriers, mechanically assemblable based on the shapes and mutual dimensional adjustments of their structures, having as common geometrical center, the center of the horizontal drive shaft (15) or axle which is the central structure or the roller (1) core, provided with bearings or ball bearings (13); wide variety of disks coupled in a fixed and dynamic way that allows the horizontal and circular tubular body of the roller (1), articulated, flanked and axially supported by the shaft (15) that crosses the rings (2, 3, 7, 8, 9) and by the covers (13 and 18) coupled to both ends, together, may have a free circular motion and drive the movement of a conveying belt (not shown) to transfer bulk materials (not shown) over considerable distances, according to the length provided to said belt (not shown). The system, thus conceived, configures a continuous open path of potential access, progressively diminished, of solid contaminants of different granulometries, liquids and gases, capable of being operated in reverse direction by the centrifugal force generated by the normal rotation of the belt drive roller and by disk assembly, thus guaranteeing the integrity and functionality of such roller (1) for a prolonged useful time.

FIG. 1 is a vertical sectional section of one of the two ends of the roller (1) of the present invention, showing the successive mechanical and dynamic coupling of a series of vertical covers or drilled disks (2), (3), (7), (8) and (9), crossed by the shaft (15) of the roller, of different compositions and seals in the form of circular rings of different designs, mechanically assemblable based on the shapes and dimensional adjustments (4) of their compositions, having as common geometric center, the center of the horizontal shaft (15) or axle, perpendicular to said disks (2, 3, 7, 8 and 9), which is the central structure or roller core, provided with bearings or coupled call bearings that allow the horizontal and circular tubular body (1) of the roller, articulated, and axially supported by the shaft (15) that carries the mechanism, and flanked by the disk or cover (2), coupled at both ends of the body, together, can have a free circular motion and drive the movement of a conveyor belt (not shown) to move bulk materials over considerable distances, according to the length provided to said belt.

Referring to FIG. 1, the primary floating-type (outer) seal or shock-proof, solid contaminant sweeper disk (3) consists of a vertical circular cover or outer drilled disk (3), floating-type shock-proof, solid contaminant sweeper, fixed to the shaft (15) and provided with a rotary movement, which prevents penetration and clogging of coarse contaminants by its centrifugal action, which is complemented by a fixed setup of 4-step vertical labyrinths, with millimetric adjustment (4) in the first step to prevent the entrance of fine contaminants. This seal prevents the entry of coarse and fine solids, and only allows liquids and moisture to enter the chamber (5).

Referring to FIG. 1, the chamber (5) with vertical diaphragm (6) for the hermetic sealing of the system, prevents liquids and moisture from entering by the coupling ad to the system, and is formed by the inner vertical wall of the external floating circular cover (3) or first disk, which is provided at the outer peripheral ends, with two perpendicular protruding circular walls, separated by a groove or trench, of circular trajectory, projected inwardly, also adopting an F-shape, which fit together millimetrically and complementarily, within the spaces of an analogous peripheral section in an inverted to the left F-shape, provided on the external vertical wall, at the external peripheral end, of a second disk (7), forming trenches or calibrated steps of a first four-step labyrinth (10). The inner vertical side of this same second disk (7) is provided with 3 protruding circular walls or separate horizontal walls, coupled millimetrically in a specular form, with other 3 horizontal protruding walls of circular trajectory, provided in a third disk (8) in the form of a malt cross conforming half a labyrinth whose complete structure ends with the coupling of a fourth disk (9), provided with three analogous horizontal protruding walls in an inverted to the left and upside-down F-shape sectional form, thus, integrating a second labyrinth (11) of 9 steps. This complete structure thus described defines the first three seals or critical system barriers to contaminant penetration. To retain contaminants, the 9-steps triple vertical labyrinth seal (11) along the bearing holder cover (13) form a chamber (12) on the outside to isolate the contaminants and divert them outside the roller.

Further, with reference to FIG. 1, the suspension (16) with chamber (17) or fourth barrier of the system for internal sealing of the roller, grease storage and correct positioning of the bearing(s) or ball bearings (14), which support the shaft (15) or axle, allows the efficient, flexible operation of the roller (1). This suspension (16) is a drilled disk (16) that admits the passage of the shaft (15) or axle; its edge closest to the bearing or ball bearing is curved, and rests in contact with the groove defined by the end, also curved on the end of the drilled disk (2) closest to the center of the shaft (15), from which the suspension annular wall protrudes turning on itself (16) that functions as a damper of the rotary movements of the shaft (15) that crosses the body (1) of the roller.

Regarding FIG. 1, the body of the roller (1) is one of a circular tubular shape whose both ends carry embedded in a circular recess two disks (2) as external sweeping covers, in the shape of a circular funnel centrally drilled, which form two parallel housings pointing toward the inside of the body of the roller (1), and which will contain all the parts of the mechanism that together allow to operate the functions of the bearings or ball bearings (14) and the shaft (15), which drive and allow the operation of the roller (1) as such. The first seal of the system is formed by a vertical cover or disk (3) that isolates the mechanism from the coarse contaminants that could enter the interior of the mechanism housed inside the body of the roller (1), by means of a millimetric adjustment (4); the inner face periphery of such cover or disk (3) is provided with two spaced horizontal, circular walls of rectangular section, thus assuming the vertical cover (3) an F-shape, thus forming steps or trenches or circular barriers of rectangular section, facing toward the inside of the center of the roller body (1), which overlap coincidentally with two other horizontal spaced walls facing analogously, in a horizontally inverted F-shape, provided at the end of an arched wall projecting outward from the outer vertical wall of the circular ring (7) of the E-shaped section, (left in FIG. 2); leaving a millimetric adjustment step between the series of overlapping walls coupled together in an F-F (inverted to the left) wall-trench-wall pattern of four steps involving four changes of direction to be traversed by the contaminating particles that could be introduced into the mechanism, thus decreasing their kinetic energy and penetration depth, thus configuring the structure of a second seal or barrier in the form of a four-step labyrinth, which only allows the passage of liquids and eliminates the possibility of access of coarse solid particles, which are ejected outside by the centrifugal force generated by the tangential angular momentum, due to the rotary movement of the roller body (1).

In addition, regarding FIG. 1, the third barrier or seal of the system is formed by the space delimited by the arched wall that descends from the four-step labyrinth, and becomes a vertical wall that ends in a vertically inverted T-shaped section, where the trajectory of the nine-step labyrinth begins in the horizontal lower wall of the disk (7), when touching the inner face of the vertical wall of the disk (3), and having above it the diaphragm (6) that seals said chamber (5), elements, which together form a second barrier or chamber (5) that houses a diaphragm (6) whose vertical edge, which in contact with the inner wall of the cover (3), seals the chamber (5) and prevents the entry of liquids and moisture to the next seal of the system.

In addition, regarding FIG. 1, the fourth barrier or seal of the nine-step labyrinth (6) is formed by the overlapping coupling of horizontal wall set of rectangular section in an E-F-(inverted to the left)-F-E (inverted to the left) pattern of the rings (13), (14) and (15), whose millimetric adjustments allow to create the free spaces that define the geometry of the nine steps of the labyrinth that leads to the cavity (12) which, together with the ball bearing holder cover (13), allows to isolate the contaminants and divert them outside of the roller. These nine steps imply nine changes to the direction to be traveled by the contaminating particles that could be introduced into the mechanism; thus, decreasing and nullifying their kinetic energy and their penetration depth. Here, the nine-step labyrinth begins at the end of the diaphragm (6) of the chamber (5) with vertical diaphragm, with the composition of the first out of nine steps, defined by a first out of three horizontal projections or walls of rectangular section, in an inverted T shape in the lower part of the vertical wall of the second disk (7) and is completed by the coupling by overlapping of the horizontal wall set of rectangular section in an E-malt cross-E (inverted to the left) pattern of the second (7), third (8), and fourth (9) rings, respectively, whose millimetric adjustments allow to create the free spaces that define the geometry of the nine steps of such labyrinth that leads to the cavity (12) which, together with the ball bearing holder cover (13), allows to isolate the contaminants and divert them outside the roller (1). These nine steps imply nine changes to the direction to be traveled by the contaminating particles that could be introduced into the mechanism; thus, decreasing and nullifying their kinetic energy and their penetration depth.

Further, regarding FIG. 1, this triple vertical nine-step labyrinth structurally consists on the dynamic coupling of the second (7), third (8) and fourth (9) disks, by the mutual interpenetration of the annular vertical walls spaced in the empty spaces defined by their geometries and the corresponding millimetric adjustment, in order to form trenches or labyrinths or paths that allow the interaction of the roller structure (1) and the mass of potential contaminants, so that the centrifugal force generated by their movements can expel them outside the mechanism. This nine-step labyrinth begins at the end of the diaphragm (6) of the chamber (5) with vertical diaphragm (6), with the composition of the first out of nine steps, defined by a first out of three horizontal projections or annular walls of rectangular section, provided at the bottom of the vertical wall of the second disk (7) ending in a vertically inverted T-shape, and in parallel with the lower arm prolonged to the left of the malt cross (8), the first step is formed, and the remaining steps are completed by the mutual insertion of horizontal annular walls of rectangular section of the second (7), third (8) and fourth (9) disks in an E-malt cross (or two-fronted F)-E (inverted to the left) pattern, which are inserted into the respective empty spaces of their forms, and whose millimetric adjustments allow creating the free spaces that define the geometry of the nine steps of such labyrinth, which leads to the cavity (12) that, together with the ball bearing holder (13), allows to isolate the contaminants and divert them outside the roller (1). These nine steps imply nine changes to the direction to be traveled by the contaminating particles that could be introduced into the mechanism; thus, decreasing and nullifying their kinetic energy and their penetration depth. On the outside, it forms a cavity in conjunction with the ball bearing holder cover (13) to isolate contaminants, and to divert them outside of the roller (1) by means of the centrifugal action of the assembly.

In addition to FIG. 1, the disk (2), drilled in its center so the shaft (11) passes through it allowing the roller (1) to work, carries on the inner edges of said drilling a bushing (16) or suspension whose outer edge follows the shape of the bottom of the housing (2), to which it is firmly coupled with a small margin of freedom so that in conjunction with its inner edge, extended toward inside the roller (1) body and, bent on itself at its end, it can function as a damping suspension (16) in contact with the driving shaft (15), providing mobility and a certain dynamic flexibility to the operation of the roller (1).

Finally, regarding FIG. 1, the suspension outer edge (16) supports the position of a cover (18) in a ring form that allows fixing the correct position of the bearing (14) or ball bearing that allows the rotation of the roller body (1). The bearing (14) or ball bearing, on its outer face, is kept in the correct position by means of the ball bearing holder cover (13) which is fixed by a ring (19) that touches the ring edge (8) with a section similar to a bifrontal F, which in turn, is coupled with the disks (7) and (9) that articulate and form the sealing system that prevents the intrusion of solids and liquids that can eventually damage the efficient operation mechanism of the roller (1).

Figure 2:
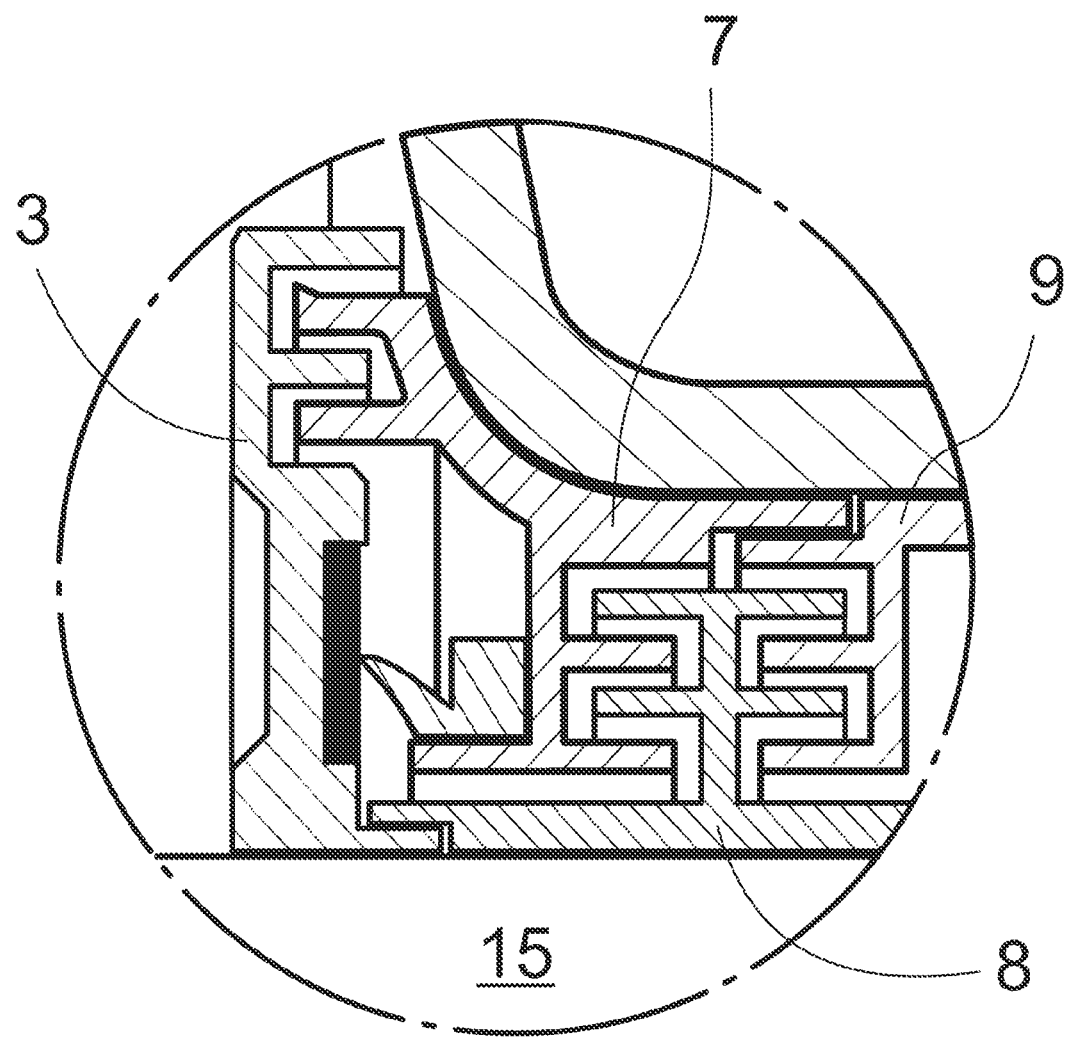
FIG. 2 is a side view of an enlarged sectional view of the roller sealing system for bulk material conveying belts of the present invention, showing the progressive barriers that constitute the system structure.

FIG. 2 is an enlarged vertical sectional view of the roller sealing system for bulk material conveyor belts of the present invention, showing the progressive barriers that constitute the system structure.

Referring to FIG. 2, the chamber (5) with vertical diaphragm (6) for the hermetic sealing of the system, prevents liquids and moisture from entering through the coupling to the system, and it is formed by the inner vertical wall of the external floating circular cover (3) or first disk, which is provided at the outer peripheral ends, with two perpendicular protruding circular walls, separated by a groove or trench, of circular trajectory, projected inwardly, also adopting an F-shape, which fit and adjust together millimetrically and complementarily, within the spaces of an analogous peripheral section in an inverted F-shape toward the left, provided on the external vertical wall, at the external peripheral end, of a second disk (7), forming trenches or calibrated steps of a first four-step labyrinth (10), thus integrating a second labyrinth (11) of 9 steps.

Figure 3:
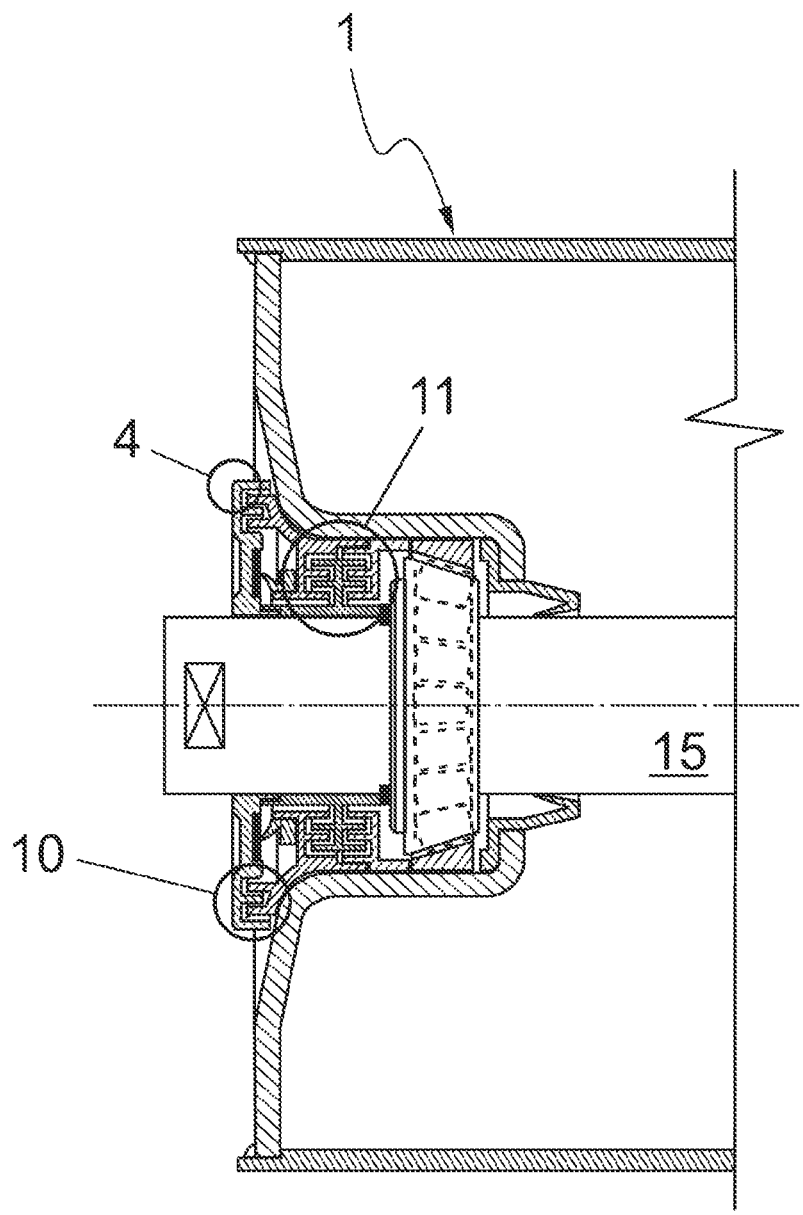
FIG. 3 is a side view of a sectional section of the roller sealing system for bulk material conveyor belts of the present invention, showing the arrangements and interactions of all roller components.

FIG. 3 is a side view of a sectional section of the roller sealing system for bulk material conveyor belts of the present invention, showing the arrangements and interactions of all roller components; but mainly, it shows the first four-step labyrinth, as well as the second nine-step labyrinth.

Figure 4:
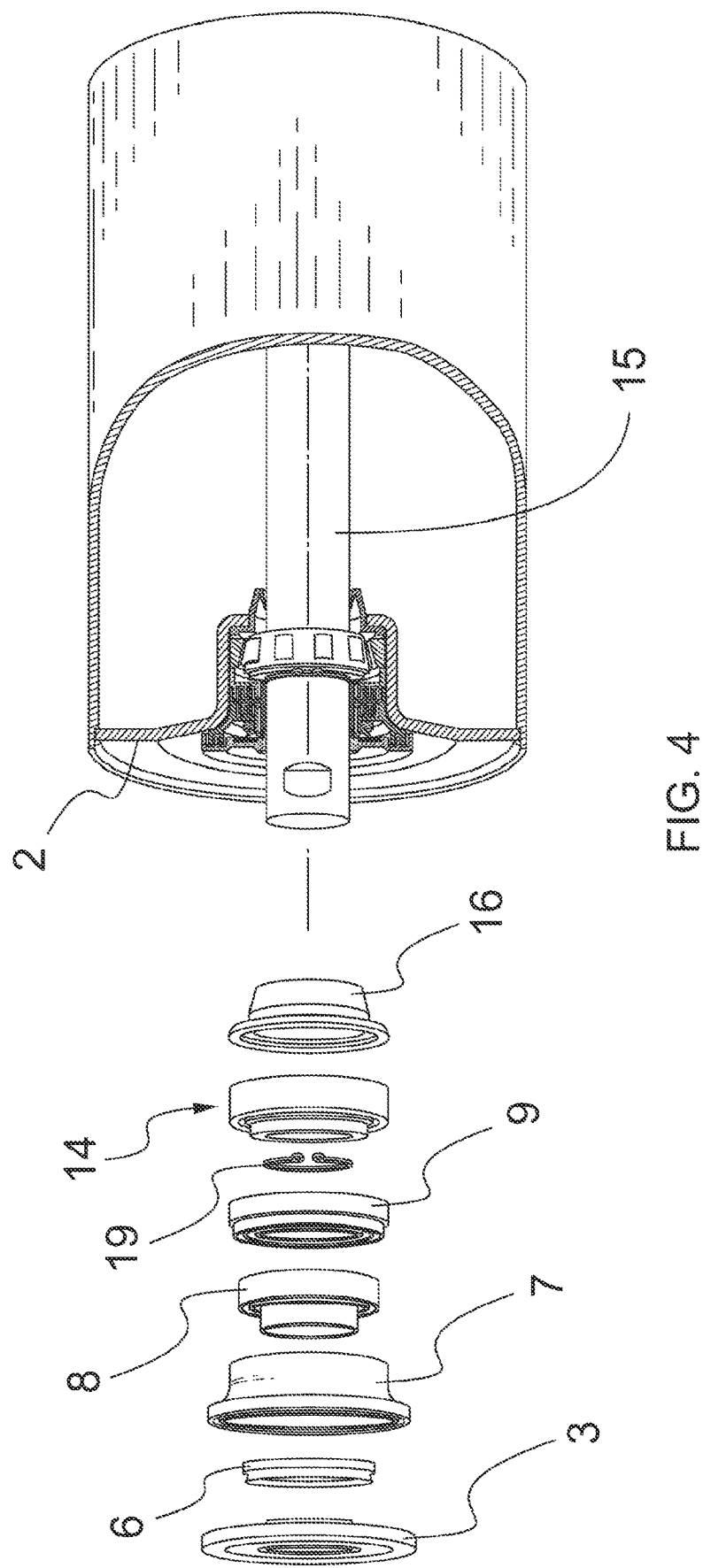
FIG. 4 is an exploded view of the roller sealing system for bulk material conveyor belts of the present invention, showing the progressive barriers that constitute the system structure.

Essentially, FIG. 4 shows the hermetic centrifugal system that is formed by the successive mechanical and dynamic coupling of a wide variety of vertical covers of various compositions or seals in the form of rings and circular barriers, mechanically assemblable based on the shapes and mutual dimensional adjustments of their structures, having as common geometrical center, the center of the horizontal shaft (15) or axle which is the central structure or the roller core (1), provided with bearings or ball bearings (13); a wide variety of disks coupled in a fixed and dynamic way that allows the horizontal and circular tubular body of the roller (1), articulated, flanked and axially supported by the shaft (15) that crosses the rings (2, 3, 7, 8, 9) and by the covers (13 and 18) coupled to both ends, together, may have a free circular motion and drive the movement of a conveying belt (not shown) to transfer bulk materials (not shown) over considerable distances, according to the length provided to said belt (not shown). The system, thus conceived, configures a continuous open path of potential access, progressively diminished, of solid contaminants of different granulometries, liquids and gases, capable of being operated in reverse direction by the centrifugal force generated by the normal rotation of the belt drive roller and by disk assembly, thus guaranteeing the integrity and functionality of such roller (1) for a prolonged useful time.

In addition, FIG. 4 is a vertical sectional section of one of the two ends of the roller (1) of the present invention, showing the successive mechanical and dynamic coupling of a series of vertical covers or drilled disks (2), (3), (7), (8) and (9), crossed by the shaft (15) of the roller, of different compositions and seals in the form of circular rings of different designs, mechanically assembled based on the shapes and dimensional adjustments (4) of their compositions, having as common geometric center, the center of the horizontal shaft (15) or axle, perpendicular to said disks (2, 3, 7, 8 and 9), which is the central structure or roller core, provided with bearings or coupled call bearings that allow the horizontal and circular tubular body (1) of the roller, articulated, and axially supported by the shaft (15) that carries the mechanism, and flanked by the disk or cover (2), coupled at both ends of the body, together, can have a free circular motion and drive the movement of a conveyor belt (not shown) to move bulk materials over considerable distances, according to the length provided to said belt.

Referring again to FIG. 3, the primary floating-type (outer) seal or shock-proof disk (3), solid contaminant sweeper, consists of a vertical circular cover or outer, drilled disk (3), floating-type shock-proof, solid contaminant sweeper type, fixed to the shaft (15) and provided with a rotary movement, which prevents by its centrifugal action, penetration and clogging of coarse contaminants, which is complemented by a fixed setup of 4-step vertical labyrinths, with millimetric adjustment (4) in the first step to prevent the entrance of fine contaminants. This seal prevents the entry of coarse and fine solids, and only allows liquids and moisture to enter the chamber (5).

Chamber (5) with vertical diaphragm (6) for the hermetic sealing of the system prevents liquids and moisture from entering through the coupling ad to the system, and is formed by the inner vertical wall of the external floating circular cover (3) or first disk, which is provided at the outer peripheral ends, with two perpendicular protruding circular walls, separated by a groove or trench, of circular trajectory, projected inwardly, also adopting an F-shape, which fit together millimetrically and complementarily, within the spaces of an analogous peripheral section in an inverted F-shape, provided on the external vertical wall, at the external peripheral end, of a second disk (7), forming trenches or calibrated steps of a first four-step labyrinth (10). The inner vertical side of this same second disk (7) is provided with 3 protruding circular walls or separate horizontal walls, coupled millimetrically in a specular form, with other 3 horizontal protruding walls of circular trajectory, provided in a third disk (8) conforming half a labyrinth whose complete structure ends with the coupling of a fourth disk (9), provided with three analogous horizontal protruding walls in an inverted and upside-down F-shape sectional form; thus, integrating a second nine-step labyrinth (11). This complete structure thus described defines the first three seals or critical barriers of the system against contaminant penetration. To retain contaminants, the 9-steps triple vertical labyrinth seal (11) along the bearing holder cover (13) form a chamber (12) on the outside to isolate the contaminants and divert them outside the roller.

Further, with reference to FIG. 4, the suspension (16) with chamber (17) or fourth barrier of the system for internal sealing of the roller, grease storage and correct positioning of the bearing or ball bearings (14), which support the shaft (15) or axle, allows the efficient, flexible operation of the roller (1). This suspension (16) is a drilled disk (16) that admits the passage of the shaft (15) or axle; its edge closest to the bearing or ball bearing is curved, and rests in contact with the groove defined by the end, also curved on the end of the drilled disk (2) closest to the center of the shaft (15), from which the suspension annular wall protrudes turning on itself (16) that functions as a damper of the rotary movements of the shaft (15) that crosses the body (1) of the roller.

In addition, the body of the roller (1) is one of a circular tubular shape whose both ends carry embedded two disks (2) in a circular recess as external sweeping covers, in the shape of a circular funnel centrally drilled, which form two parallel housings pointing toward the inside of the body of the roller (1), and which will contain all the parts of the mechanism that together allow to operate the functions of the bearings or ball bearings (14) and the shaft (15), which drive and allow the operation of the roller (1) as such. The first seal of the system is formed by a vertical cover or disk (3) that isolates the mechanism from the coarse contaminants that could enter the interior of the mechanism housed inside the body of the roller (1), by means of a millimetric adjustment (4); the inner face periphery of such cover or disk (3) is provided with two spaced horizontal, circular walls of rectangular section, thus assuming the vertical cover (3) an F-shape, thus forming steps or trenches or circular barriers of rectangular section, facing toward the inside of the center of the roller body (1), which overlap coincidentally with two other horizontal spaced walls facing analogously, in a horizontally inverted F-shape, provided at the end of an arched wall projecting outward from the outer vertical wall of the circular ring (7) of the E-shaped section; leaving a millimetric adjustment step between the series of overlapping walls coupled together in an F-F wall-trench-wall pattern of four steps involving four changes of direction to be traversed by the contaminating particles that could be introduced into the mechanism, thus decreasing their kinetic energy and penetration depth, thus configuring the structure of a second seal or barrier in the form of a four-step labyrinth (10), which only allows the passage of liquids and eliminates the possibility of access of coarse solid particles, which are ejected outside by the centrifugal force generated by the tangential angular momentum, due to the rotary movement of the roller body (1).

In addition, regarding FIG. 4, the third barrier or seal of the system is formed by the space delimited by the arched wall that descends from the four-step labyrinth, and becomes a vertical wall that ends in a vertically inverted F-shaped section, where the path of the nine-step labyrinth begins in the horizontal lower wall of the disk (7), when touching the inner face of the vertical wall of the disk (3), and having above it the diaphragm (6) that seals said chamber (5), elements, which all together form a second barrier or chamber (5) that houses a diaphragm (6) whose vertical edge, which in contact with the inner wall of the cover (3), seals the chamber (5) and prevents the entry of liquids and moisture to the next seal of the system.

In addition, regarding FIG. 4, the fourth barrier or seal of the nine-step labyrinth (6) is formed by the overlapping coupling of horizontal wall set of rectangular section in an E-F-(inverted to the left)-F-E (inverted to the left) pattern of the rings (13), (14) and (15), whose millimetric adjustments allow to create the free spaces that define the geometry of the nine steps of such labyrinth that leads to the cavity (12) which, together with the ball bearing holder cover (13), allows to isolate the contaminants and divert them outside the roller. These nine steps imply nine changes to the direction to be traveled by the contaminating particles that could be introduced into the mechanism; thus, decreasing and nullifying their kinetic energy and their penetration depth. Here, the nine-step labyrinth begins at the end of the diaphragm (6) of the chamber (5) with vertical diaphragm, with the composition of the first out of nine steps, defined by a first out of three horizontal projections or walls of rectangular section, in an inverted T shape in the lower part of the vertical wall of the second disk (7) and is completed by the coupling by overlapping of the horizontal wall set of rectangular section in an E-F-(inverted to the left)-F-E (inverted to the left) pattern of the second (7), third (8), and fourth (9) rings, respectively, whose millimetric adjustments allow to create the free spaces that define the geometry of the nine steps of such labyrinth that leads to the cavity (12) which, together with the ball bearing holder cover (13), allows to isolate the contaminants and divert them outside the roller. These nine steps imply nine changes to the direction to be traveled by the contaminating particles that could be introduced into the mechanism; thus, decreasing and nullifying their kinetic energy and their penetration depth.

In addition to FIG. 4, the disk (2), drilled in its center so the shaft (15) passes through it allowing the roller (1) to work, carries, on the inner edges of said drilling, a bushing (16) or suspension whose outer edge follows the shape of the bottom of the housing (2), to which it is firmly coupled with a small margin of freedom so that in conjunction with its inner edge, extended toward inside the roller (1) body and, bent on itself at its end, it can function as a damping suspension (16) in contact with the driving shaft (15), providing mobility and a certain dynamic flexibility to the operation of the roller (1).

Finally, regarding FIG. 4, the suspension outer edge (16) supports the position of a cover (18) in a ring form that allows fixing the correct position of the bearing (14) or ball bearing that allows the rotation of the roller body (1). The bearing (14) or ball bearing, on its outer face, is kept in the correct position by means of the ball bearing holder cover (13) which is fixed by a ring (19) that touches the ring edge (8) with a section similar to a bifrontal F, which in turn, is coupled with the disks (7) and (9) that articulate and form the sealing system that prevents the intrusion of solids and liquids that can eventually damage the efficient operation mechanism of the roller (1).

It will become evident to those skilled in the art, that innumerable modifications can be made to the present invention without departing from the spirit and scope thereof, so that the present invention should be considered in its broadest and non-limiting sense.

The invention claimed is:
1. A centrifugal hermetic roller sealing system, external material intrusion-proof, provided on moving drive rollers, for a transportation device and conveyor belts for transporting bulk materials, the system comprising:
- a tubular shape body having a first end with a first cover and a second end with a second cover, the tubular shape body having inside:
- a drive shaft and a ball bearing connected to the drive shaft;
- a floating-type shock-resistance outer primary seal designed to prevent clogging of coarse contaminants, the floating-type shock-resistance outer primary seal includes a vertical rotating outer cover and a fixed 4-steps vertical labyrinth with millimetric adjustment, the floating-type shock-resistance outer primary seal prevents the entrance of fine contaminants into the system;
- a chamber having a vertical diaphragm for a hermetic sealing of the system, the chamber prevents the entry of liquids and moisture to the system;
- a 9-pass vertical triple labyrinth seal to retain contaminants, the 9-pass vertical triple labyrinth seal has on an outer side a cavity in conjunction with the ball bearing holder cover to isolate contaminants, and to divert them outside the centrifugal hermetic roller roller; and
- a suspension barrier having a chamber for internal roller sealing, grease storage, and positioning of the drive shaft;
- wherein the floating-type shock-resistance outer primary seal, the chamber, the 9-pass vertical triple labyrinth seal, and the suspension are interconnected and coupled to each other.

2. The sealing system according to claim 1, wherein the floating-type shock-resistance outer primary seal, the chamber, the 9-pass vertical triple labyrinth seal, and the suspension are axially supported by the drive shaft, which has covers coupled to both ends, the drive shaft has a free circular movement and is adapted to move a conveyor belt to move the bulk materials over considerable distances.

3. The sealing system according to claim 1, wherein the vertical rotative outer cover has on a periphery of an inner face two horizontal protruding walls having an F-shaped rectangular section, and projecting toward an inside of the drive shaft, the two horizontal protruding walls are coupled and inserted complementarily with two other horizontal protruding walls, from a second F-shaped rectangular section, belonging to a periphery of a contiguous ring that projects them outside the drive shaft and are inserted into grooves on a first section of the vertical rotative outer cover; the vertical rotating outer cover is a shock-proof, a solid contaminant sweeper, that prevents clogging of coarse contaminants.

4. The sealing system according to claim 1, wherein the chamber is formed by the space delimited by an arched wall of a continuous ring , which descends from the fixed 4-steps vertical labyrinth, and becomes a vertical wall that carries three horizontal annular walls on an inner face providing an E-shape, ending in a vertically inverted T-shaped section, in which a path of the 9-pass vertical triple labyrinth seal begins on a horizontal lower wall of the continuous ring , which when touching the inner face of a vertical wall of the vertical rotative outer cover , delimits the space of the chamber, and carrying the vertical diaphragm that seals the chamber fixed in an outer right angle of the vertically inverted T-section; the chamber is located opposite to the four-steps vertical labyrinth formed by the F-shaped end sections which adapt between a vertical rotative outer cover and the F-shaped end sections of the continuous ring.

5. The sealing system in accordance with claim 1, wherein the 9-pass vertical triple labyrinth seal, begins at the end of the vertical diaphragm of the chamber and includes a first horizontal projection having a rectangular section and located at a bottom end of the vertical wall of a continuous ring and ends in a vertically inverted T-shape; wherein the 9-pass vertical triple labyrinth seal includes nine changes of a direction to be traveled by the contaminating particles.

6. The sealing system in accordance with claim 1, wherein the suspension barrier includes a housing having a hole drilled at its center so the drive shaft passes through, allowing the roller to rotate and having curved inner edges to accommodate the ball bearings.

* * * * *